(12) United States Patent
Uber

(10) Patent No.: US 8,274,001 B2
(45) Date of Patent: Sep. 25, 2012

(54) WEIGHING APPARATUS HAVING OPPOSED WHEELS

(75) Inventor: John Uber, Ithaca, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 359 days.

(21) Appl. No.: 12/650,601

(22) Filed: Dec. 31, 2009

(65) Prior Publication Data

US 2011/0155475 A1 Jun. 30, 2011

(51) Int. Cl.
*G01G 19/00* (2006.01)

(52) U.S. Cl. ..... 177/145; 177/160; 177/161; 198/470.1; 198/474.1; 141/83

(58) Field of Classification Search ............ 141/83, 141/165, 166, 168, 372; 177/145, 160, 161; 198/470.1, 474.1
See application file for complete search history.

(56) References Cited

U.S. PATENT DOCUMENTS

| 1,902,512 | A | 3/1933 | Mehl |
| 3,978,971 | A | 9/1976 | Conrow et al. |
| 4,064,987 | A | 12/1977 | Rowan |
| 4,163,488 | A | 8/1979 | Brook |
| 4,488,635 | A | 12/1984 | Linville |
| 4,566,584 | A | 1/1986 | Lindstrom |
| 4,802,571 | A * | 2/1989 | Born et al. ............... 198/626.1 |
| 4,972,549 | A | 11/1990 | Van Den Nieuwelaar et al. |
| 5,037,351 | A | 8/1991 | Van Den Nieuwelaar et al. |
| 5,434,366 | A | 7/1995 | Troisi |
| 6,073,667 | A * | 6/2000 | Graffin ...................... 141/372 |
| 6,084,184 | A * | 7/2000 | Troisi ........................ 177/145 |
| 6,109,426 | A | 8/2000 | Messer, III |
| 6,399,901 | B1 * | 6/2002 | Nishino et al. ............... 177/52 |
| 6,479,767 | B1 | 11/2002 | Zicher |
| 6,595,348 | B1 | 7/2003 | Grasswill et al. |
| 6,748,983 | B2 * | 6/2004 | Bausch ..................... 141/165 |
| 6,793,067 | B1 | 9/2004 | Raupp |
| 6,915,894 | B2 | 7/2005 | Raupp |
| 7,096,152 | B1 | 8/2006 | Ong |
| 7,141,745 | B1 * | 11/2006 | Schoon et al. ........... 177/25.15 |
| 7,154,055 | B2 * | 12/2006 | Hebenstreit ................ 177/83 |
| 2005/0194193 | A1 * | 9/2005 | Hebenstreit ................ 177/50 |
| 2011/0290568 | A1 * | 12/2011 | Asari et al. ................... 177/1 |

FOREIGN PATENT DOCUMENTS

EP 2284504 A1 2/2001
WO 2007/031176 A1 3/2007

* cited by examiner

*Primary Examiner* — Randy W Gibson
(74) *Attorney, Agent, or Firm* — Standley Law Group LLP

(57) ABSTRACT

Weighing apparatus for weighing and conveying items of various shape and size. The weighing apparatus apparatus includes at least two oppositely rotating wheels that engage an item to be weighed. A force measurement element, such as a load cell, is provided to weigh the item to be weighed while the item is conveyed by the wheels in a suspended position. More than one pair of wheels may be employed.

32 Claims, 5 Drawing Sheets

WEIGHING APPARATUS HAVING OPPOSED WHEELS

BACKGROUND OF THE INVENTIVE FIELD

The present invention relates generally to weighing apparatus for weighing and conveying items of various shape and size. More specifically, the present invention is directed to a weighing apparatus having at least two wheels for weighing and conveying an article.

Weighing apparatus may be used in a variety of processes. For example, weighing apparatus may be used as part of a conveyor system to weigh items as they travel along the conveyor. One such system, known generally as a checkweigher, may include multiple (e.g., three) conveyors arranged one after the other, each conveyor having a separate purpose. In such an arrangement, the first conveyor may be an infeed conveyor, the second a weighing conveyor, and the third a discharge conveyor. The infeed conveyor may accelerate items in a manner that provides the spacing necessary to allow the weighing conveyor to weigh one item at a time.

Such a system is generally placed in line with another conveyor system. If a customer already has a conveyor system in place and wants to add a checkweigher to that system, the customer must typically reroute or reconfigure the current conveyor system to accept the checkweigher. Such a reconfiguration can be quite costly. Thus, it is desirable in at least some circumstances to weigh an item without the above-described need for conveyor system reconfiguration. The present invention addresses this need.

SUMMARY OF THE GENERAL INVENTIVE CONCEPT

A system and method of the present invention is operative to weigh an item of interest with the item in a suspended position above a conveyor, thereby eliminating the aforementioned need to break an existing conveyor line to accept a conventional checkweigher. Unlike known suspended weighing systems, however, a system of the present invention uses opposing wheels, rather than belts of a finite length. Consequently, the spacing belts, worms and other devices that currently must be used to further separate items to be weighed on such known systems are unnecessary with a system of the present invention.

More specifically, the ability of a system of the present invention to suspend and weigh an item of length L (where L is greater than the length of the contact area between opposing wheels) means that the item can be weighed with only "daylight" (i.e., a minimal gap) existing between successive items. For example, a series of standup pouches or a bandolier of packages (e.g., a continuum of pouches with an interconnecting medium) can be weighed with the present invention. In addition to performing a weighing function, a device of the present invention is able to detect an empty package within a bandolier of packages.

As can be observed, exemplary embodiments of the present invention may include one or more pairs of rotating opposed wheels, a frame or other support structure for maintaining said wheels in a position above that of an existing conveyor, a drive system for driving one of more of said wheels, and one or more load cells or other devices for determining the weight of an item of interest. A system of the present invention may be used to weigh items such as, without limitation, pouches, cartons, bottles, letters, and mailing pouches, with only minimal spacing required between items. A more complete understanding of the present invention may be obtained through review of the following description and drawing figures relating to several exemplary embodiments thereof.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 2:
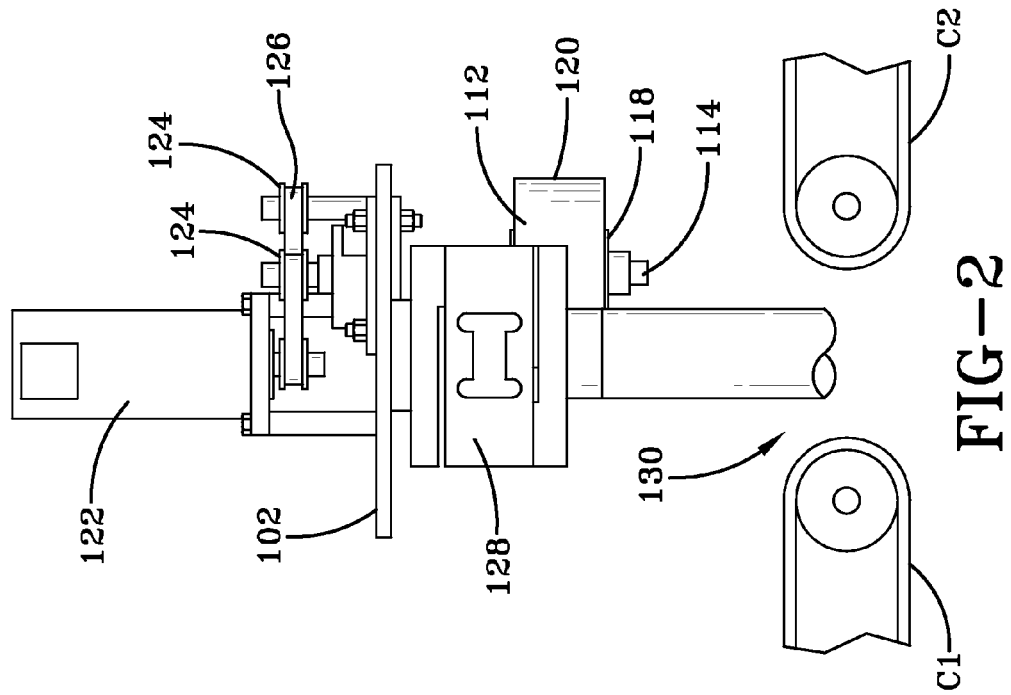
FIG. 2 is a side elevation view of the exemplary embodiment shown in FIG. 1.
Figure 1:
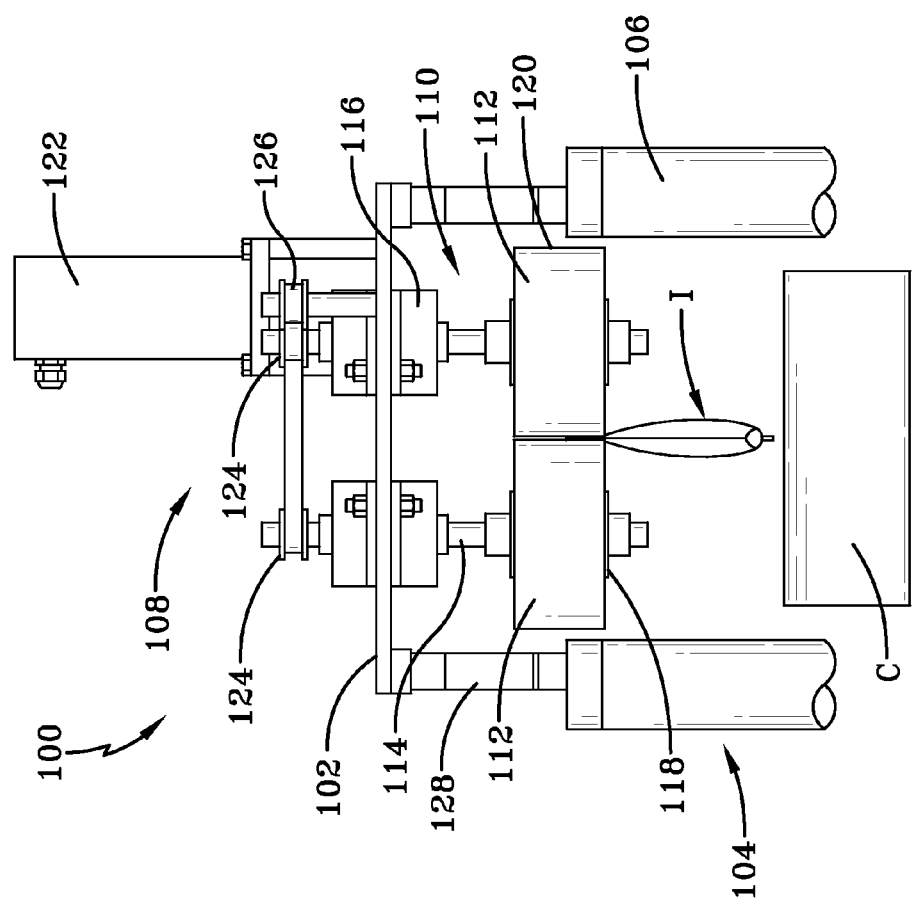
FIG. 1 is a front elevation view of one exemplary embodiment of the present invention.
Figure 3:
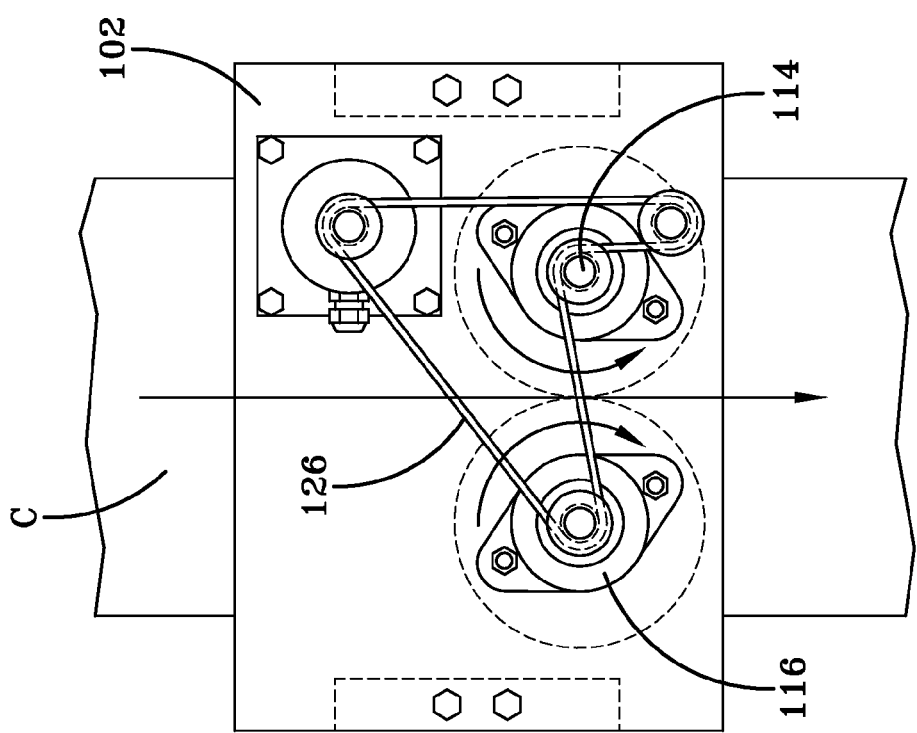
FIG. 3 is a top plan view of the exemplary embodiment of shown in FIG. 1.

FIGS. 1-3 illustrate one exemplary embodiment of a weighing apparatus 100 of the present invention. The weighing apparatus 100 may be arranged in-line with a conveyer system C that may be used to transport an item I towards the weighing apparatus 100.

The weighing apparatus 100 is shown to include a support structure 102 for maintaining a number of weighing apparatus components in an elevated position. The support structure 102 can have any configuration known in the art. For example, the support structure 102 may have a base 104. When present, the base 104 may be connected to the conveyor system C, a ground surface, or virtually any other surrounding structure. In other embodiments, the base 104 may be a portion of a conveyor structure or another apparatus.

In the exemplary embodiment shown, the support structure 102 has a base 104 that includes a plurality of posts 106. The posts 106 may be arranged adjacent to or near the conveyer system C. As illustrated in FIGS. 1-3, the support structure 102 may form a bridge that spans the width of the conveyor system C.

The exemplary weighing apparatus 100 of FIGS. 1-3 is shown to include a drive portion 108 and a driven portion 110. The driven portion 110 includes a pair of oppositely rotating wheels 112 that are rotated by the drive portion 108 via corresponding drive shafts 114. As can be best observed in FIG. 1, each drive shaft 114 is arranged such that its corresponding wheel 112 is rotated in a plane substantially parallel to that of conveyor movement. The driven portion 110 may also include a bearing 116 that is associated with each drive shaft 114 to facilitate rotation thereof. When present, the bearing 116 may be attached to the support structure 102. Preferably, but not necessarily, the space between the wheels is adjustable to accommodate items of different thickness.

As previously described, the present invention employs wheels to suspend and transport an item of interest during the weighting process. Various wheel designs may be employed in a system of the present invention. In this particular embodiment, the wheels 112 are shown to have a rim 118 and a jacket 120. The rim 118 may be an integral part of the wheel 112 itself, or may be integral to the drive shaft 114. When present, the jacket 120 may have any number of configurations, and may be designed to correspond to the item I to be weighed. The jacket 120 may also be interchangeable in order to adapt the weighing apparatus 100 for the weighing of different items I. The wheels 112 themselves may also be interchangeable for this purpose.

The drive portion 108 may be virtually any drive system capable of providing proper wheel rotation. Typically, a drive portion 108 of the present invention will include at least one motor for this purpose. The motor may be coupled to other drive components to facilitate rotation of the wheels 112. For example, as shown in FIGS. 1-3, a motor 122 is coupled to a pair of pulleys 124, each of which is associated with one of drive shafts 114. The pulleys 124 are coupled to the motor 122 via a belt 126. This arrangement causes the wheels 112 to rotate in opposite directions when the motor 122 is energized. In other embodiments, a set of gears may be connected to a motor to cause wheel rotation. Alternatively, each wheel 112 of a system of the present invention may be driven by an independent motor or motor and drive system. If desired, the drive portion 108 may also be used to accelerate items I being weighed so as to keep appropriate spacing between successive articles. The item I is moved through the wheels 112 in the direction indicated by the arrow in FIG. 3.

The weighing apparatus 100 may also include one or more force measuring devices (e.g., load cells) 128. In this particular embodiment, the force measuring devices 128 are located off to the side of the support structure 102 to provide a cantilevered support of the wheel assembly. Alternatively, a force measuring device(s) can be positioned directly above the wheels 112.

Various force measuring devices may be used in the present invention. Such devices may include, without limitation, at least one load cell, load cells in a flexure system, or an Electromagnetic Force Restoration scale. As shown, a force-measuring device(s) 128 may be arranged in force contact with the support structure 102.

When an item I passes between the wheels 112, the weight of the item I, as well as the weight of the supporting structure 102 and the devices attached to it is applied to the force measuring devices 128. The weight of the item I may then be determined by subtracting the known weights of the supporting structure 102 and other devices attached to it from the weight detected by the force measuring devices 128.

The weighing apparatus 100 may be located at a gap 130 between two conveyors C1 and C2, so that an item I to be weighed may be supported solely by the wheels 112 of the weighing apparatus during the actual weighing process. The weighing apparatus 100 may also be placed around a conveyor system C with the wheels 112 arranged so that the article is lifted off of the conveyor system to complete the weighing process. In such an embodiment, a series of non-weighing wheels or side-engaging belts could be used to lift the package to a vertical position that ensures separation between the package bottom and the conveyor below.

The weighing apparatus 100 is shown with a design wherein an article to be weighed is suspended from the wheels above an associate conveyor(s). Nevertheless, in a further exemplary embodiment of the present invention a weighing apparatus may be arranged in an upside down fashion to the one presented in FIGS. 1-3, such that the load cell(s) or other weight measurement elements and associated components may reside below an associated conveyor(s).

Figure 4:
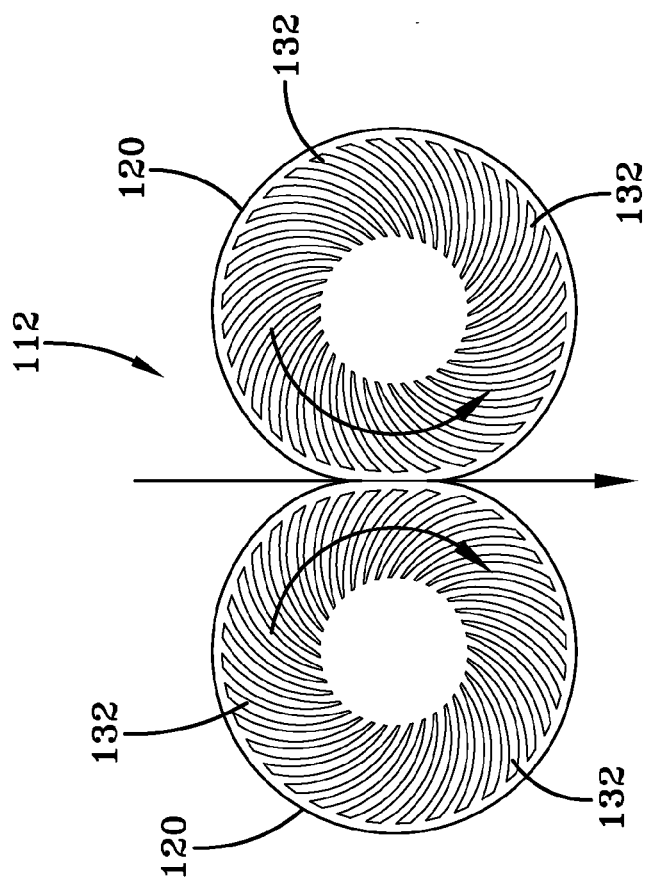
FIG. 4 is a top plan view of one exemplary embodiment of a set of wheels that may be used in a system of the present invention.
Figure 6:
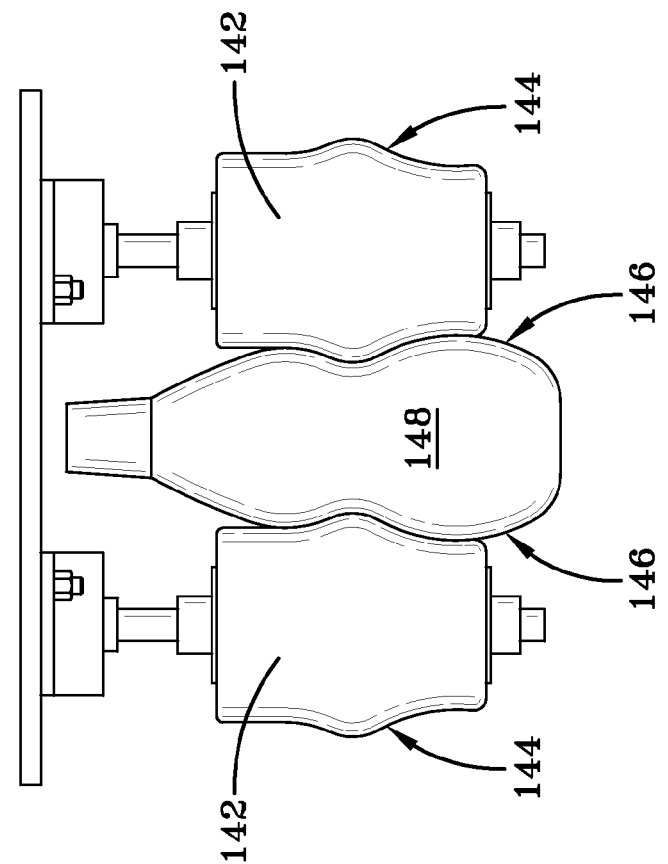
FIG. 6 is a front elevation view of yet another exemplary embodiment of the present invention.
Figure 5:
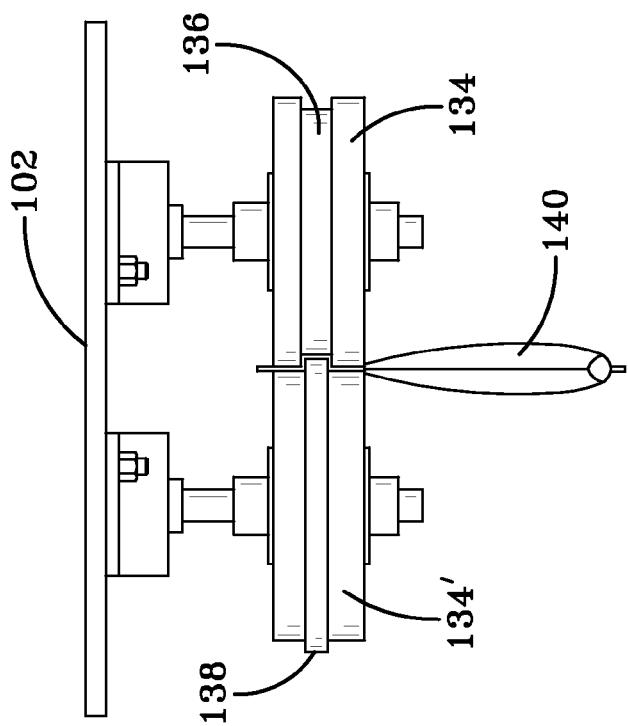
FIG. 5 is a front elevation view of another exemplary embodiment of the present invention.

FIGS. 4-6 depict various exemplary wheels 112 that may be used with a weighing apparatus of the present invention. It can be observed from FIG. 4, that the jacket 120 may be pliable and the wheels 112 may contain a plurality of voids 132. The voids 132 may be arranged (in a swirl-type pattern) around the wheel 112, as shown. The voids 132 may facilitate wheel deformation, thereby allowing the wheels 112 to better grip a plurality of different items while the items are moved through the wheels.

Another exemplary embodiment of the wheels of the present invention is illustrated in FIG. 5. In this embodiment, one wheel 134 may include a groove 136, while the opposing wheel 134' is provided with a projecting circumferential rib 138 that is received by the groove. Consequently, when an item, such as the bandolier item 140 shown, is engaged by the wheels 134, 134', the item is securely suspended by its partial entrapment between the rib 138 and groove 136.

A further exemplary embodiment of a wheel 142 for use in the present invention is illustrated in FIG. 6. In this embodiment, the wheel 142 is provided with a contour 144 that substantially corresponds to the contour 146 of an item 148 to be weighed. The wheel 142 may again have an outer jacket or it may be of internal construction. The outer contour 144 of the wheel 142 helps to support/suspend the item 148 during its transition through an associated weighing apparatus. As such, it should be understood that the contour of such a wheel may vary in association with the contour of a particular item to be supported/suspended therefrom.

In yet another alternative wheel construction (not shown), a single wheel 112 may actually be constructed from a plurality of stacked wheels (i.e., wheel segments). For example, a number of thin individual wheels may be stacked to form an overall wheel 112 of the present invention. These wheel segments may be assembled with uniform or non-uniform gaps therebetween. In order to better transport items of varying contour, the individual wheel segments may be dimensioned and arranged to form an overall wheel of a specific contour, or the wheel segments may be constructed from a deformable material. Such a wheel may also be useful when a weighing apparatus will be used to weigh items of different height.

The wheels and/or wheel jackets of the present invention may be made from various materials. In one exemplary embodiment, the wheels and/or jackets may be made from a material that is sufficiently pliant to permit the wheels to partially or fully conform to the shape of an article to be weighed. Alternatively, the material may also be hard, so that any material abrasion is kept to a minimum.

In an alternative embodiment of the present invention, a set of rigid wheels may be used to engage the underside of a flange on an item to be weighed. In this exemplary embodiment, support is provided from below the flange of the item, and the item is not necessarily pinched between the wheels. One example of a package that may be effectively weighed with such an embodiment is a PET soda bottle, where a flange is typically located below the cap.

Figure 7:
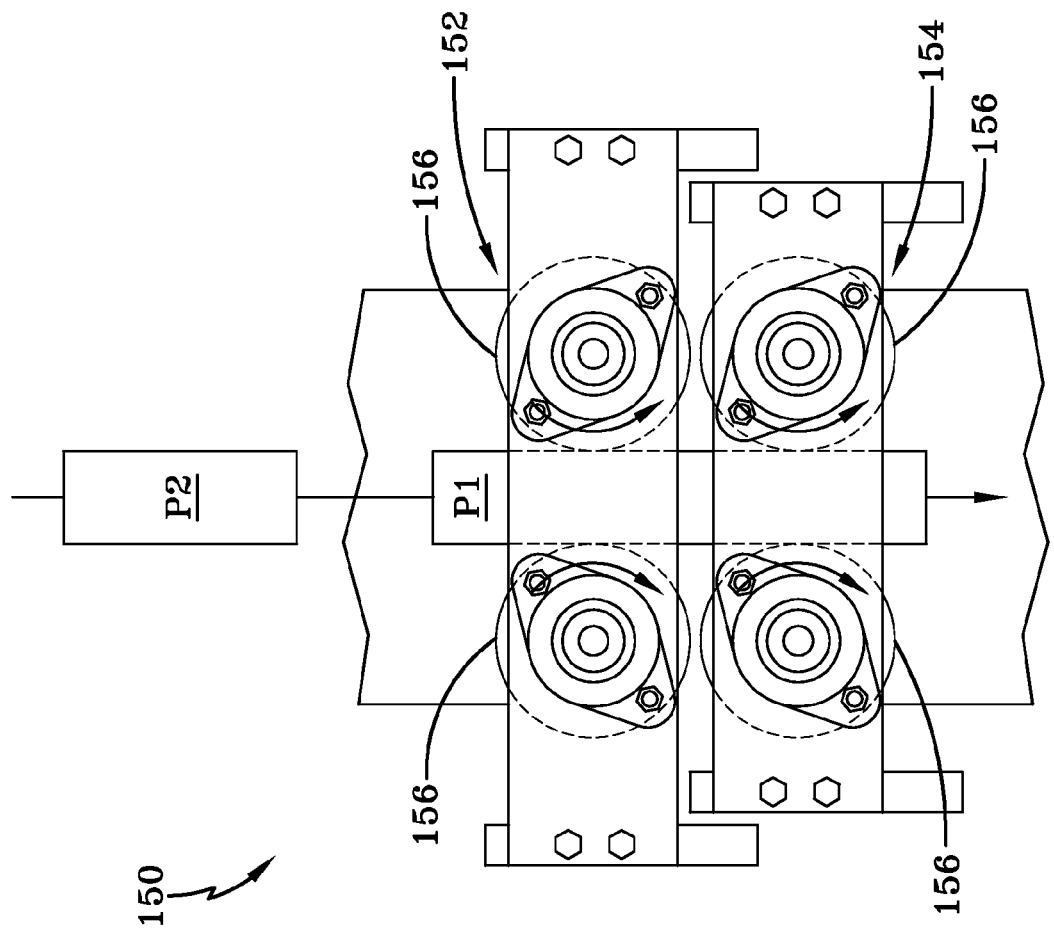
FIG. 7 is a top plan view of still another exemplary embodiment of the present invention.

FIG. 7 illustrates yet another exemplary embodiment of a weighing apparatus of the present invention. This weighing apparatus 150 may include multiple pairs of wheels 152, 154, which wheel pairs may be arranged in succession with respect to the path of travel of items to be weighed (as indicated by the arrow). Each pair of wheels 152, 154, again includes opposed wheels 156 rotating in an opposite direction. Each wheel 156 may have a plurality of constructions and/or shapes, as has been described above with respect to the wheels of FIGS. 1-6.

When multiple pairs of wheels are used, the distance of the wheel pairs from the conveyor may vary to engage items of varying height. In other words, the height of the wheel pairs may be adjustable. All of the wheel pairs or only some of the wheel pairs may be provided with such adjustability.

When multiple pairs of wheels are used, the wheel pairs 152, 154 may be adapted to allow the distance therebetween to be changed when the length of an item to be weighed is less than or exceeds the current contact length of the wheel pairs. Such a change in item length may occur as a result of, for example, a change in production output (e.g., changing from 10 inch long pouches to 4 inch pouches, as illustrated by packages P1 and P2), or because items of varying length are mixed into the production output to be weighed. An increase in the distance between wheel pairs 152, 154 may also be utilized for weighing several small articles simultaneously. Simultaneously weighing several articles may be advantageous in order to determine a mean weight value or to enhance the speed of the weighing process.

When a plurality of wheel pairs are present, a system of the present invention can handle items of varying length and determine the weight of those items by selectively using an appropriate set of opposed wheels. For example, an item of shorter length may be weighed by utilizing fewer than all the wheel pairs present. When pairs of wheels are used, it is also possible for the wheels to support all items at the same elevation, or the wheel-engagement height can be changed from axis to axis to reduce the gap between support points of the wheels.

A force-measuring device (not shown) may be associated with each pair of wheels or each pair of wheels may be associated with a separate force-measuring device. In the latter case, the weight values determined by each force-measuring device may be summed in a way known in the art to determine a total weight of each item weighed.

Figure 8:
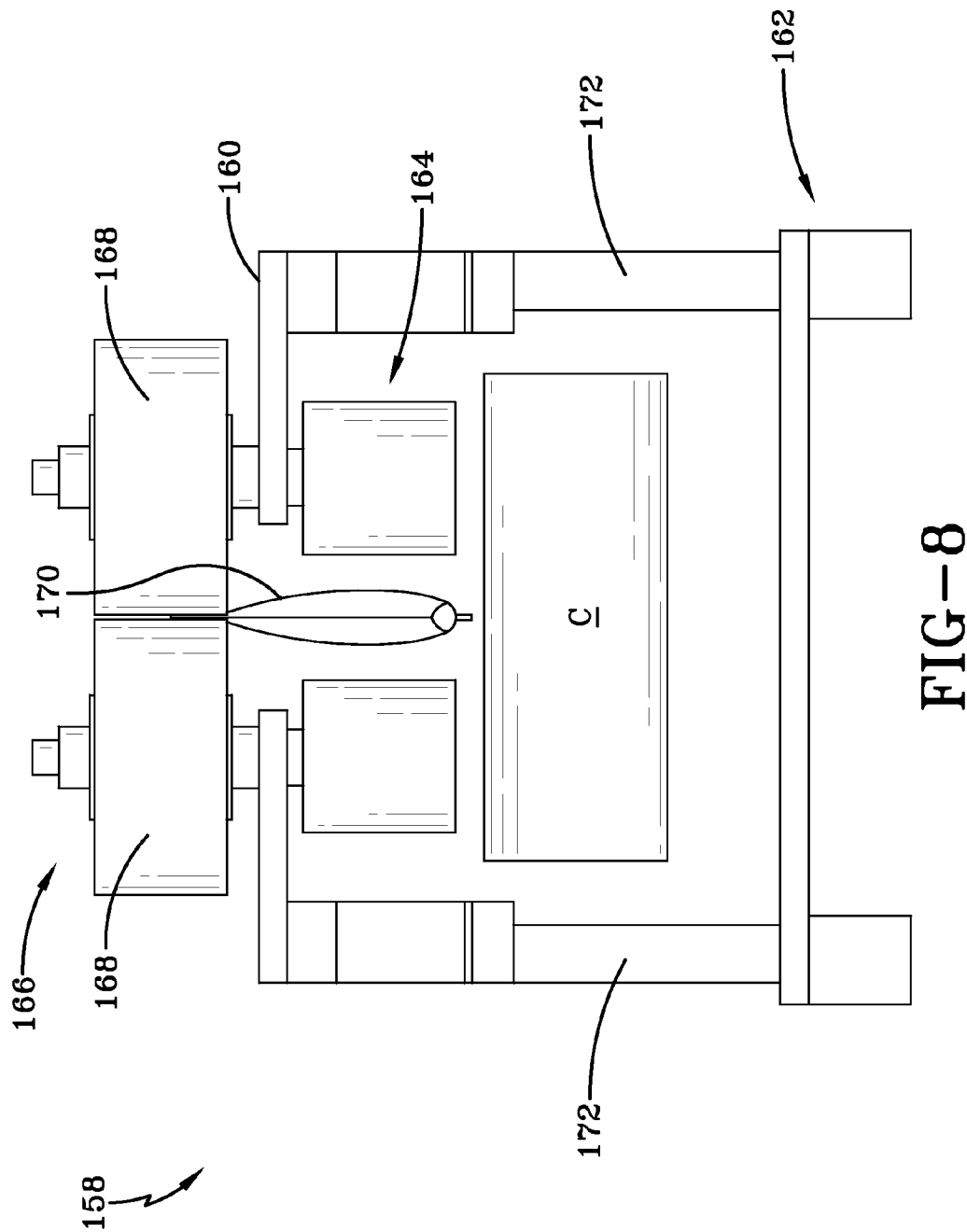
FIG. 8 a top plan view of an alternative exemplary embodiment of the present invention.

An alternative exemplary embodiment of a weighing apparatus 158 of the present invention is depicted in FIG. 8. This embodiment is again shown to include a support structure 160 and a base 162. However, unlike the previously shown and described embodiments, the positions of the drive portion 164 and driven portions 166 of this apparatus 158 are reversed. Specifically, the drive portion 164 is suspended beneath the support structure 160, and the wheels 168 of the driven portion 166 reside above the support structure. The apparatus 158 is still constructed in a manner that suspends an item to be weighed 170 above an associated conveyor C during the weighing process.

FIG. 8 shows the apparatus 158 to include a pair of force measuring devices 172, such as a pair of load cells. However, any suitable force measuring device may again be used, such as, without limitation, the force measuring device mentioned previously. A single load cell could also be used by centering the load cell under a bridge plate that connects opposite sides of the assembly beneath the conveyor C. The reverse construction illustrated in FIG. 8 may be applied to an apparatus of the present invention having a single wheel pair or multiple wheel pairs, as described above.

It is to be understood that any embodiment of the present invention may be designed such that the rotational velocity of the wheels can be adjusted/controlled. In this manner, the rate at which items are passed through and weighed by the system can be regulated.

While certain embodiments of the present invention are described in detail above, the scope of the invention is not to be considered limited by such disclosure, and modifications are possible without departing from the spirit of the invention as evidenced by the following claims:

What is claimed is:

1. A weighing apparatus comprising:
a support structure;
at least one pair of wheels suspended from said support structure, said wheels adjacently arranged and adapted to receive and engage items to be weighed as said items are conveyed past said at least one pair of wheels, such that said items will be supported in a suspended position during weighing and returned to a conveyor in substantially the same orientation as received by said at least one pair of wheels;
a driving device for causing rotation of said wheels, one of said wheels rotating in a direction opposite to the direction of rotation of the other of said wheels, such that items are transported through said apparatus by rotation of said at least one pair of wheels; and
a force measuring device associated with said at least one pair of wheels and adapted to determine the weights of items to be weighed while said items are suspended from said wheels.

2. The apparatus of claim 1, wherein each of said wheels is suspended on a driveshaft that extends downward from said support structure.

3. The apparatus of claim 2, wherein said driveshafts include a pulley that is coupled to a motor-driven belt.

4. The apparatus of claim 1, wherein said force measuring device is selected from the group consisting of at least one load cell, load cells in a flexure system, and an Electromagnetic Force Restoration scale.

5. The apparatus of claim 1, wherein an adjustable gap is present between said wheels.

6. The apparatus of claim 1, wherein one wheel includes a circumferential rib and the other wheel includes a circumferential groove that receives at least a portion of said rib.

7. The apparatus of claim 1, wherein said wheels are contoured so as to substantially conform to at least a portion of an item to be weighed.

8. The apparatus of claim 1, wherein at least a portion of at least one of said wheels is constructed of a pliant material that permits the shape of said at least one wheel to at least partially conform to the shape of an item to be weighed.

9. The apparatus of claim 1, wherein at least one wheel of a wheel pair includes an outer jacket.

10. The apparatus of claim 9, wherein said outer jacket is interchangeable with other outer jackets of dissimilar material and/or size.

11. The apparatus of claim 1, wherein at least one wheel of a wheel pair is interchangeable with other wheels of dissimilar material and/or size.

12. The apparatus of claim 1, wherein a plurality of wheel pairs are present, said wheel pairs arranged in succession along a path of travel of said items to be weighed.

13. The apparatus of claim 12, wherein the distance between successive wheel pairs is adjustable.

14. The apparatus of claim 12, wherein an item is weighed while suspended from only a certain wheel pair(s), and said wheel pair(s) is selectable.

15. The apparatus of claim 1, wherein said apparatus is located at a gap between conveyors.

16. A weighing apparatus comprising:
a support structure;
a driven portion including at least one pair of wheels suspended beneath said support structure on respective driveshafts, said wheels adjacently arranged and adapted to receive and engage items to be weighed as said items are conveyed past said at least one pair of wheels, such that said items will be supported in a suspended position during weighing and returned to a conveyor in substantially the same orientation as received by said at least one pair of wheels;

a driving portion for causing opposite rotation of wheels in a given wheel pair such that items to be weighed are transported through said apparatus by rotation of said wheels, said driving portion including at least one drive motor associated with said at least one pair of wheels; and at least one force measuring device associated with said at least one pair of wheels and adapted to determine the weights of items to be weighed while said items are suspended from said at least one pair of wheels.

17. The apparatus of claim 16, wherein said driveshafts include a pulley that is coupled to said at least one drive motor by a belt.

18. The apparatus of claim 16, wherein said force measuring device is selected from the group consisting of a load cell, load cells in a flexure system, and an Electromagnetic Force Restoration scale.

19. The apparatus of claim 16, wherein an adjustable gap is present between said wheels.

20. The apparatus of claim 16, wherein a plurality of wheel pairs are present, said wheel pairs arranged in succession along a path of travel of said items to be weighed.

21. The apparatus of claim 20, wherein the distance between successive wheel pairs is adjustable.

22. The apparatus of claim 20, wherein an item is weighed while suspended from only a certain wheel pair(s), and said wheel pair(s) is selectable.

23. A weighing apparatus comprising:
a support structure;
a driven portion associated with said support structure and including at least one pair of wheels mounted on respective driveshafts, said wheels adjacently arranged and adapted to engage items to be weighed such that said items are supported in a suspended position during weighing;
a driving portion, said driving portion including at least one drive motor coupled by a belt to a pulley on each driveshaft, said driving portion producing opposite rotation of wheels in a given wheel pair such that items to be weighed are transported through said apparatus by rotation of said wheels; and
at least one force measuring device located between said support structure and a base, said at least one force measuring device associated with said at least one pair of wheels and adapted to determine the weights of items to be weighed while said items are suspended from said at least one pair of wheels.

24. The apparatus of claim 23, wherein said at least one pair of wheels is located above said support structure.

25. The apparatus of claim 23, wherein said at least one pair of wheels is located below said support structure.

26. The apparatus of claim 23, wherein said force measuring device is selected from the group consisting of a load cell, load cells in a flexure system, and an Electromagnetic Force Restoration scale.

27. The apparatus of claim 23, wherein an adjustable gap is present between said wheels.

28. The apparatus of claim 23, wherein a plurality of wheel pairs are present, said wheel pairs arranged in succession along a path of travel of said items to be weighed.

29. The apparatus of claim 28, wherein the distance between successive wheel pairs is adjustable.

30. The apparatus of claim 28, wherein an item is weighed while suspended from only a certain wheel pair(s), and said wheel pair(s) is selectable.

31. A weighing apparatus comprising:
a support structure;
at least one pair of wheels, each of said wheels suspended on a driveshaft that extends downward from said support structure, said wheels adjacently arranged and adapted to engage items to be weighed such that said items are supported in a suspended position during weighing;
a driving device for causing rotation of said wheels, one of said wheels rotating in a direction opposite to the direction of rotation of the other of said wheels, such that items are transported through said apparatus by rotation of said at least one pair of wheels; and
a force measuring device associated with said at least one pair of wheels and adapted to determine the weights of items to be weighed while said items are suspended from said wheels.

32. A weighing apparatus comprising:
a support structure;
a plurality of wheel pairs suspended from said support structure, said wheel pairs arranged in succession along a path of travel of said items to be weighed and adapted to engage items to be weighed such that said items are supported in a suspended position during weighing;
a driving device for causing rotation of said wheels, one of said wheels rotating in a direction opposite to the direction of rotation of the other of said wheels, such that items are transported through said apparatus by rotation of said at least one pair of wheels; and
a force measuring device associated with said at least one pair of wheels and adapted to determine the weights of items to be weighed while said items are suspended from said wheels.

* * * * *